US012257190B2

(12) United States Patent
Milo et al.

(10) Patent No.: US 12,257,190 B2
(45) Date of Patent: Mar. 25, 2025

(54) MEDICAL BACKBOARD/STRETCHER DEVICE

(71) Applicants: Thomas K. Milo, Cuyahoga Falls, OH (US); Angelina L. Milo, Cuyahoga Falls, OH (US)

(72) Inventors: Thomas K. Milo, Cuyahoga Falls, OH (US); Angelina L. Milo, Cuyahoga Falls, OH (US)

( * ) Notice: Subject to any disclaimer, the term of this patent is extended or adjusted under 35 U.S.C. 154(b) by 794 days.

(21) Appl. No.: 17/066,539

(22) Filed: Oct. 9, 2020

(65) Prior Publication Data

US 2021/0106472 A1 Apr. 15, 2021

Related U.S. Application Data

(60) Provisional application No. 62/912,805, filed on Oct. 9, 2019.

(51) Int. Cl.

| | |
|---|---|
| ***A61G 1/013*** | (2006.01) |
| ***A61G 1/02*** | (2006.01) |
| ***A61G 1/048*** | (2006.01) |

(52) U.S. Cl.

CPC ........... *A61G 1/013* (2013.01); *A61G 1/0231* (2013.01); *A61G 1/048* (2013.01); *A61G 2203/70* (2013.01)

(58) Field of Classification Search

CPC . A61G 1/00; A61G 1/01; A61G 1/013; A61G 1/0231; A61G 1/04; A61G 1/044; A61G 1/048; A61G 7/05; A61G 7/0526; A61G 7/057; A61G 7/05769; A61G 7/05776; A61G 7/10; A61G 2203/70; A61G 2203/72; A61G 2203/723; A61G 2203/80; A61G 13/12; A61G 13/126; A61G 13/1265; A61G 1/042; F41H 5/08; F41H 3/00;

(Continued)

(56) References Cited

U.S. PATENT DOCUMENTS 5,179,746 A * 1/1993 Rogers ................ A61G 1/0231 5/628

2008/0141463 A1 * 6/2008 Dionne .............. A61G 7/05769 5/713

(Continued)

FOREIGN PATENT DOCUMENTS

CN 108095908 A * 6/2018 ............... A61G 1/02

OTHER PUBLICATIONS

Machine Translation of Publication No. CN-108095908-A created Jan. 16, 2024 from Espacenet [retrieved from https://worldwide.espacenet.com/patent/search/family/062205689/publication/CN108095908A?q=CN%20108095908] (Year: 2018).*

*Primary Examiner* — Alireza Nia
*Assistant Examiner* — Gina McCarthy
(74) *Attorney, Agent, or Firm* — Brennan, Manna & Diamond, LLC

(57) ABSTRACT

A compact, inflatable medical backboard device is disclosed herein. The backboard device comprises an inflatable backboard, a protective cover, one or more straps for handling the backboard, a protective layer, a housing, and a wheel assembly for easily transporting the device, and that also serves as a pump for purposes of inflating the backboard if a source of compressed gas is not readily available. The medical backboard device can also be used as a shield to protect a user from small arms fire and other unwanted projectiles, and is easily adaptable to its surroundings.

7 Claims, 11 Drawing Sheets

(58) Field of Classification Search
CPC ........ A61F 5/01; A61F 5/0102; A61F 5/0104; A61F 5/04; A61F 5/05; A61F 5/37; A61F 5/3769; A47C 27/08; A47C 27/081; A47C 27/10; A47C 27/128; A47C 27/18; F04B 41/02
See application file for complete search history.

(56) References Cited

U.S. PATENT DOCUMENTS

| | | | | |
|---|---|---|---|---|
| 2012/0284923 | A1* | 11/2012 | Jensen ..................... | A61G 1/00 5/625 |
| 2014/0082836 | A1* | 3/2014 | Patrick ................. | A47C 27/081 5/81.1 HS |
| 2015/0283007 | A1* | 10/2015 | Carlson .................. | A61G 1/044 5/625 |
| 2018/0340528 | A1* | 11/2018 | Wang ...................... | F04B 41/02 |
| 2021/0022937 | A1* | 1/2021 | Kim ....................... | A61G 1/042 |

* cited by examiner

MEDICAL BACKBOARD/STRETCHER DEVICE

CROSS-REFERENCE TO RELATED APPLICATION

The present application claims priority to, and the benefit of, U.S. Provisional Application No. 62/912,805, which was filed on Oct. 9, 2019 and is incorporated herein by reference in its entirety.

FIELD OF THE INVENTION

The present invention relates generally to an improved and inflatable medical spine board or backboard/stretcher device that can be used to transport, for example, military personnel, patients and other injured parties or supplies. More specifically, the improved medical backboard device of the present invention is relatively lightweight, compact, durable, easy to transport, deploy and use, and can be inflated by multiple means, a number of which are self-contained. The improved medical backboard device can also be used as a shield to protect a user from small arms fire, and other unwanted projectiles. Accordingly, the improved medical backboard device of the present invention is particularly well suited for military applications, and the present specification makes specific reference thereto. However, it is to be appreciated that aspects of the present invention are also equally amenable to other like applications and devices.

BACKGROUND OF THE INVENTION

Medical backboards have a long history of use in both traditional medical settings, and also in combat and war time settings, for example, to transport the wounded from the battlefield. Unfortunately, traditional medical backboards tend to be heavy, bulky and difficult to carry and store in a combat setting due to their size and rigid nature. For example, most medical backboards are designed to be slightly wider and longer than the average human body, and are comprised of a rigid, planar board with a plurality of handles attached thereto for transporting the backboard and the patient thereon. When one considers the various other gear (and the weight associated therewith) that a soldier or combat medic must carry in a combat setting, it is readily apparent that it is relatively difficult and awkward for the soldier or medic to also transport a relatively long and wide, rigid, planar object such as a medical backboard.

Additionally, different medical backboards may be needed for different types of combat settings to help camouflage the soldier or combat medic from the enemy. For example, a medical backboard having a camouflaged pattern may be desirable for use in a forested environment, whereas a tan medical backboard may be more useful in a desert deployment. Having to procure, transport and store multiple types of medical backboards for different applications can be both costly and time consuming for the military.

Further, traditional medical backboards do not have wheels and, typically, a plurality of medical personnel are required to carry both the medical backboard and the patient or soldier thereon, oftentimes across difficult terrain and in challenging weather conditions. Further, if multiple personnel are not available to carry the medical backboard in the traditional manner, a single user may be forced to drag the patient/soldier on the backboard, which is not only difficult and laborious to do, but can also lead to further injury to the patient as the medical backboard is dragged along uneven terrain, or damage to the medical backboard.

Moreover, in a combat setting, oftentimes patient extractions from the battlefield are performed under duress and/or enemy fire. Unfortunately, traditional medical backboards, which are oftentimes made from wood or plastic, offer soldiers and medical personnel very little protection from enemy fire and other dangerous projectiles. Additionally, when said traditional medical backboards do come into contact with enemy fire and/or such projectiles, the same are oftentimes damaged and must be discarded and replaced, which can be expensive.

Therefore, there is a long felt need in the art for an improved, compact medical backboard device that is relatively easy to store, transport, deploy and use by a single individual. There is also a long felt need in the art for a medical backboard device that can afford both the user and the patient being transported thereon with protection from enemy fire and other dangerous projectiles. Additionally, there is a long felt need in the art for an improved medical backboard that can be readily adaptable to its surroundings, and that does not necessarily need to be discarded and replaced each time it comes into contact with chemical agents or bodily fluids, or it suffers damage (e.g., from use, enemy fire, or the like).

The present invention discloses a compact and inflatable medical backboard device that is configured for relatively easy storage, transport, deployment and use by a single user. The medical backboard device of the present invention is readily adaptable to its surroundings, and does not necessarily need to be discarded and replaced each time it comes into contact with chemical agents or bodily fluids, or it suffers damage. Additionally, the medical backboard device of the present invention is capable of being inflated/deflated in a combat or other remote setting, on demand, by a number of different self-contained means. In a deflated state, the device may function as a stretcher, as opposed to a rigid backboard, and can also be used as a ballistic blanket. Finally, the medical backboard device of the present invention can also be used by the user as an offensive or defensive shield to protect the user and/or the patient being transported thereon from enemy fire and other dangerous projectiles.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises an improved and inflatable medical backboard device for transporting an injured individual, such as a soldier or other military personnel, in a combat setting. The inflatable medical backboard device is compact, durable, lightweight and relatively easy to store, transport, deploy, and use, and can be inflated on demand by a number of different techniques as explained more fully below. Further, the medical backboard device of the present invention can also be used as an offensive or defensive shield against unwanted projectiles, such as small arms fire and the like, as explained more fully below.

More specifically, in one embodiment of the present invention, the improved medical backboard device comprises an inflatable backboard, a protective cover, one or more straps for handling the backboard, a protective layer, a housing, and a wheel assembly for easily transporting the improved medical backboard device and that also serves as a pump for purposes of inflating the backboard. The inflatable backboard and the protective layer are preferably enclosed within the protective cover, which shields the same from damage while being transported and/or used. Further, if the protective cover becomes damaged or comes into contact with undesirable chemical agents or bodily fluids, it can be easily replaced, as opposed to having to replace the entire medical backboard device. Additionally, the protective cover can be manufactured in a number of different colors, styles and/or designs depending on the particular application or user preference to make the device easily adaptable to its surroundings. For example, a protective cover having a camouflaged pattern can be useful in a forested environment for camouflaging the device and its user from the enemy, whereas a tan protective cover may be more desirable and useful in a desert deployment.

In a preferred embodiment of the present invention, the housing and the wheel assembly can be used to transport a container of compressed gas or to directly inflate the inflatable medical backboard. More specifically, the wheel assembly can also serve as a pump that can be used to inflate the medical backboard when a canister of compressed gas or other air supply is not readily available, as explained more fully below. Alternatively, the housing can be used to store a container of compressed gas or other medical supplies, and preferably comprises a valve and a valve selector switch which permits a user to easily inflate, deflate of maintain the pressure contained within the inflatable medical backboard of the present invention.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE FIGURES

While the specification concludes with claims particularly pointing out and distinctly claiming the present invention, it is believed that the present invention will be better understood from the following description in conjunction with the accompanying Figures, in which like reference numerals identify like elements, and wherein:

DETAILED DESCRIPTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

As previously stated, there is a need in the art for an improved, compact medical backboard device that is relatively easy to store, transport, deploy and use by a single individual, and that can afford both the user and the patient being transported thereon with protection from enemy fire and other dangerous projectiles. Additionally, there is a long felt need in the art for an improved medical backboard that can be readily adaptable to its surroundings, and that does not necessarily need to be discarded and replaced each time it comes into contact with chemical agents or bodily fluids, or it suffers damage (e.g., from use, enemy fire, or the like). Finally, there is a long felt need in the art for an improved medical backboard that is relatively inexpensive to manufacture.

The present invention discloses a compact and inflatable medical backboard device that is configured for relatively easy storage, transport, deployment and use by a single user in a challenging environment, such as a battlefield. The medical backboard device of the present invention is readily adaptable to its surroundings, and does not necessarily need to be discarded and replaced each time it suffers damage or comes into contact with chemical agents, bodily fluids, or the like. Further, the inflatable backboard portion of the device is capable of being inflated/deflated on demand in remote settings by a number of different self-contained means, and can also be used as an offensive or defensive shield to protect the user and/or the patient being transported thereon from enemy fire and other dangerous projectiles.

Figure 1:
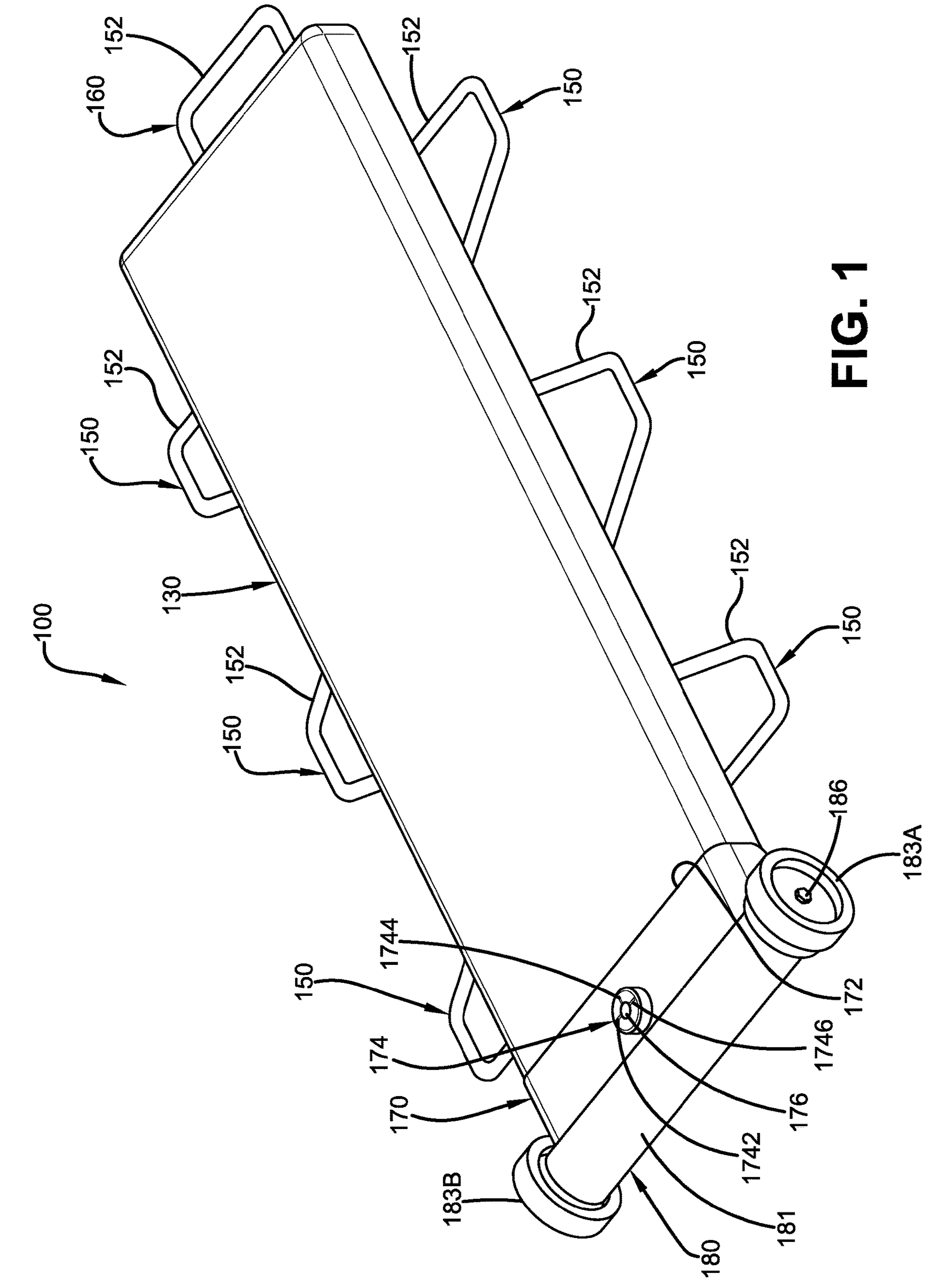
FIG. 1 illustrates a top perspective view of one potential embodiment of the improved medical backboard device of the present invention in an inflated state.

Turning now to the drawings, FIG. 1 illustrates a top perspective view of one potential embodiment of the improved medical backboard device 100 of the present invention in an inflated state. More specifically, improved medical backboard device 100 is preferably comprised of an inflatable member 110, a protective cover 130, a protective layer 140, a lateral strap assembly 150, a longitudinal strap assembly 160, a housing 170 and a wheel assembly 180.

Figure 6:
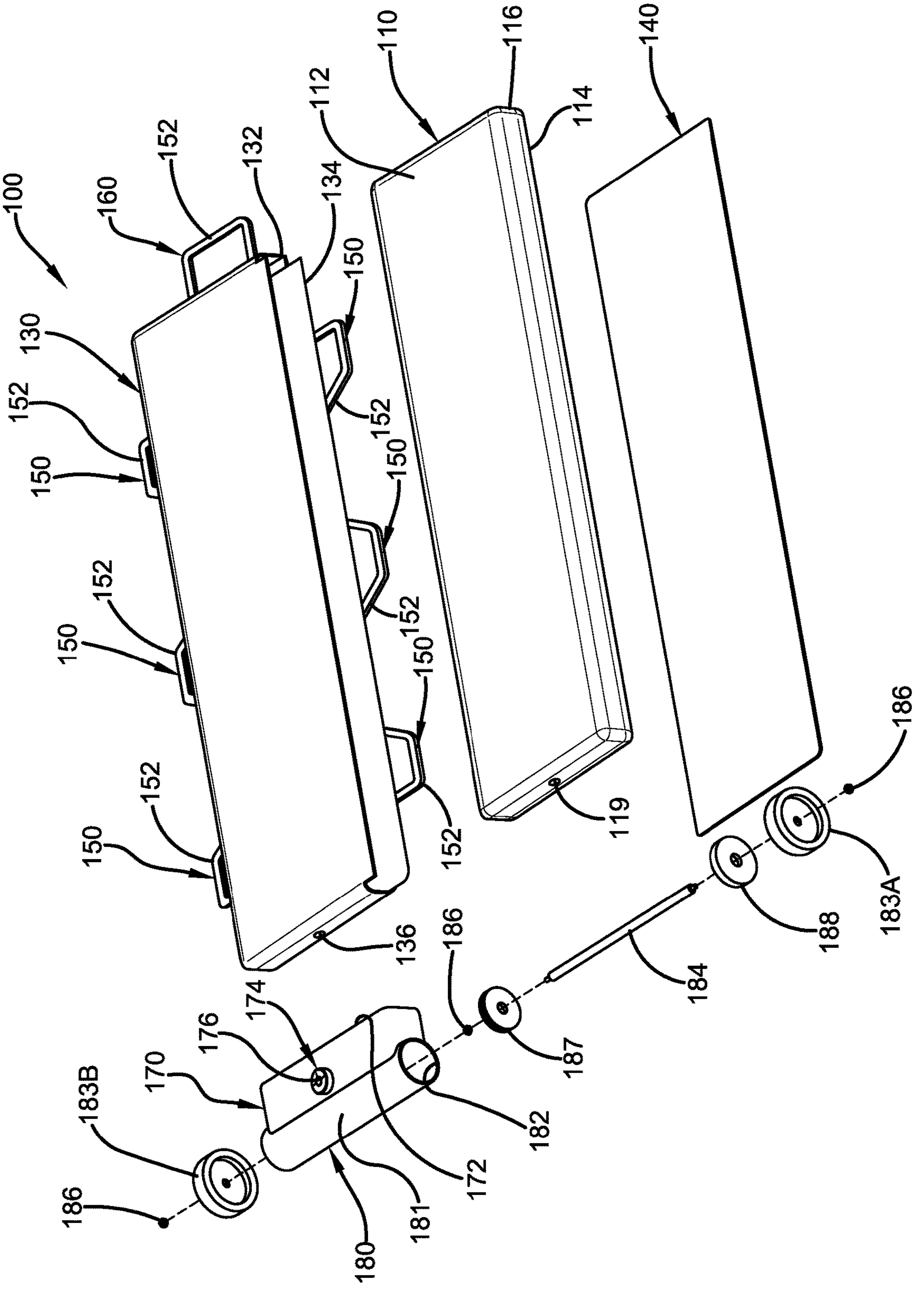
FIG. 6 illustrates a partially exploded top perspective view of the improved medical backboard device of FIG. 1.
Figure 9:
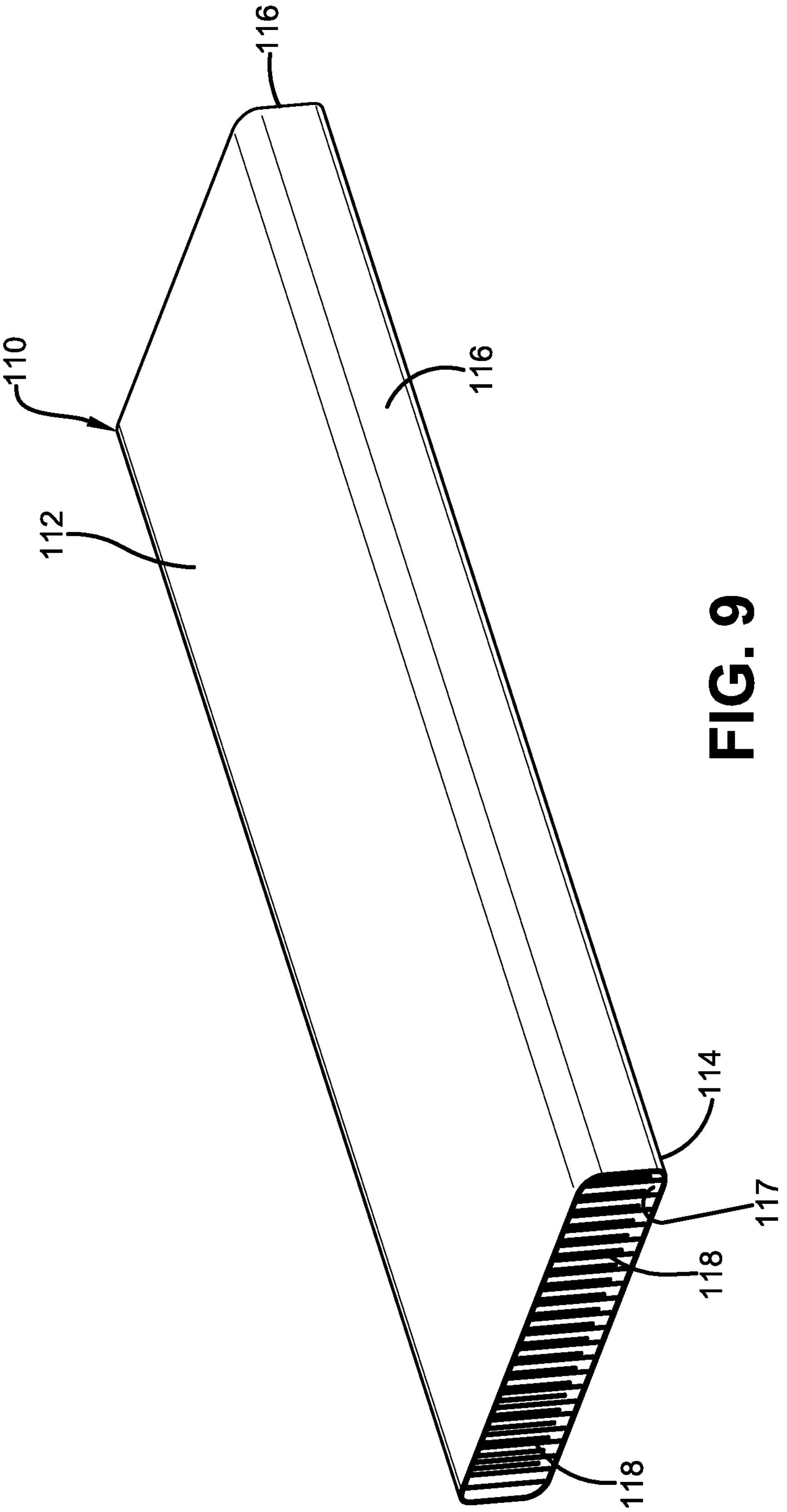
FIG. 9 illustrates a perspective view of one end of the inflated medical backboard partially cut away to show the interior of the same.

As best shown in FIGS. 6 and 9, inflatable member 110 is preferably comprised of a top 112, a bottom 114, a plurality of sides 116 connecting said top 112 to said bottom 114 to form an airtight interior 117, a plurality of filaments 118 extending between said top 112 and bottom 114, and a port 119 that can be used to inflate and/or deflate inflatable member 110. It is contemplated that inflatable member 110 can be inflated/deflated on demand, thereby making it much easier to store and transport device 100 in a compact manner when not in use. More specifically, when inflatable member 110 is in a deflated state, it may be wrapped around or stored within housing 170, thereby vastly reducing the overall footprint of medical backboard device 100 and conserving storage/transportation space.

As explained more fully below, inflatable member 110 is preferably inflated with compressed air, but it is contemplated that other materials, liquids or gasses could also be used without affecting the overall concept of the present invention. It is further contemplated that port 119 can be positioned virtually anywhere along backboard 110, though it is preferably positioned on the side 116 that is inserted into housing 170 so that it may be placed in fluid communication with a port 178 contained therein, as explained more fully below.

Inflatable member 110 is preferably inflated to between 10 and 20 psi, though it is contemplated that other pressures can also be utilized to suit user preference without affecting the overall concept of the present invention. For example, it is also contemplated that inflatable member 110 could be deflated (completely or partially) to cup or conform to the body shape of the individual being transported thereon. When properly inflated, the plurality of filaments or fibers 118 that span the interior between top 112 and bottom 114 are placed in tension, thereby providing added strength and support to the inflated backboard 110 and causing it to remain generally flat or planar. It is also contemplated that the plurality of filament or fibers 118 could be used to connect opposing sides 116 instead of the top 112 and bottom 114.

Inflatable member 110 may be constructed of many different types of materials such as fabric reinforced high density polyethylene, polyvinyl chloride (PVC), plastic or any other suitable material types such as those used in children's bouncing jumpers. The material can be thin sheets such as 30 oz./yd$^2$ to 80 oz./yd$^2$ fabric weight, or any other suitable thickness or shape.

Figure 7:
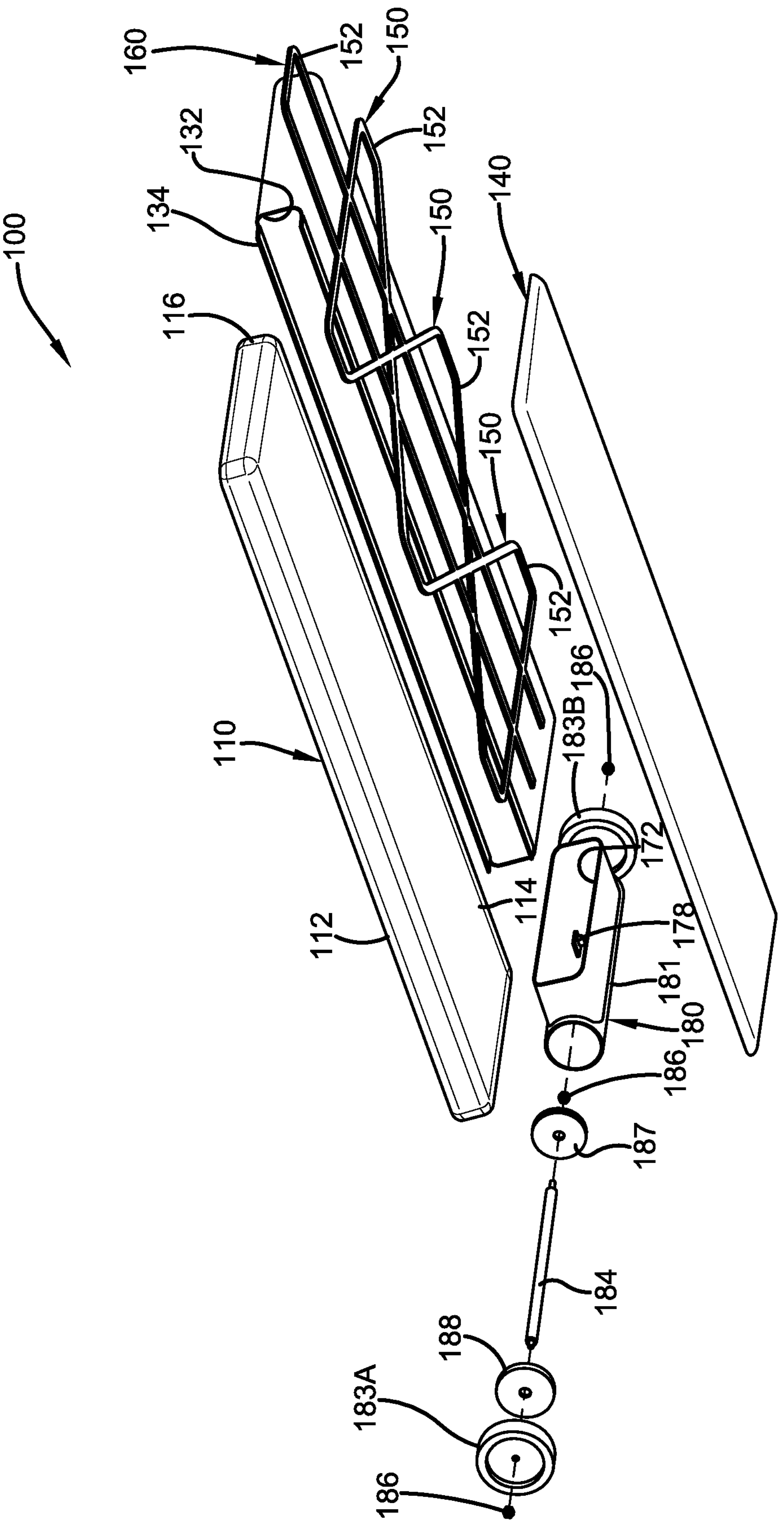
FIG. 7 illustrates a partially exploded bottom perspective view of the improved medical backboard device of FIG. 1.
Figure 8:
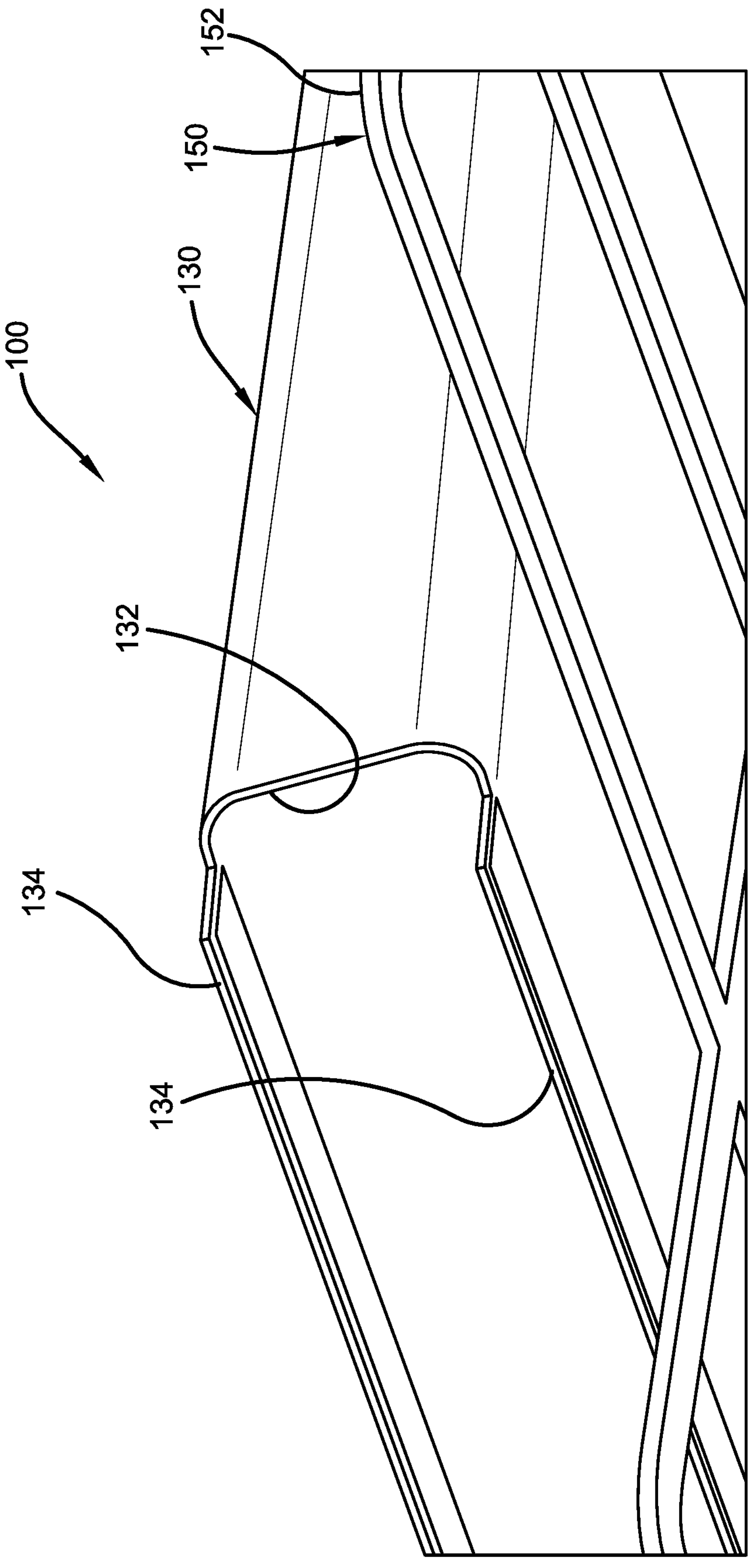
FIG. 8 illustrates a partial perspective view of one end of the inflatable medical backboard partially enclosed in the protective sleeve.

As best shown in FIGS. 6-8, protective cover 130 is an envelope type structure that is preferably comprised of an opening 132 for receipt of inflatable member 110 and protective layer 140, as explained more fully below, a flap 134 for enclosing and securing inflatable member 110 and protective layer 140 within protective cover 130, and a port opening 136 to permit port 119 of inflatable member 110 to be in fluid communication with housing 170, as explained more fully below. Flaps 134 may be secured to one another by any type of commonly known enclosing means such as hook and loop fasteners (i.e., Velcro®), a zipper, button snaps and the like.

Protective cover 130 is preferably vinyl coated though it does not need to be, and may be comprised of other materials such as a ballistic resistant material. Protective cover 130 is useful for shielding inflatable member 110 and protective layer 140 from damage while device 100 is being transported and/or used. For example, protective cover 130 will typically protect inflatable member 110 from being punctured by rocks, sticks, ground cover and other sharp objects as device 100 is being utilized. Further, if protective cover 130 becomes damaged or subjected to chemical or biological agents such as blood, urine or other bodily fluids, it can be easily replaced, as opposed to having to replace the entire medical backboard device 100, which could be both time consuming and expensive. Additionally, the protective cover 130 is easily adaptable to its surroundings and can be manufactured in a number of different colors and/or designs depending on the particular application and/or to suit user preference. For example, a camouflaged pattern may be desirable for camouflaging a user from the enemy in a forested or jungle like environment, whereas a tan protective cover may be more desirable in a desert environment.

As best shown in FIGS. 6-7, protective layer 140 can be positioned immediately adjacent to inflatable member 110 (preferably next to bottom 114) within protective cover 130 to provide an additional layer of protection to inflatable member 110, the user and the patient. More specifically, protective layer 140 is preferably comprised of a plurality of detached or detachable layers of a ballistic resistant material including, but not limited to a Kevlar® material, thereby enabling the user (not shown) to also use medical backboard device 100 as a one-handed defensive or offensive shield. The Kevlar® material is preferably layered in such a manner as to possess a minimum ballistic resilience rating of NIJ IIIA. For example, a user dragging a patient or soldier on medical backboard device 100 will have protection along the underside of the backboard device 100 from incoming enemy fire and/or other sharp objects due to the presence of protective layer 140. Further, in an offensive setting, a user may use backboard device 100, with protective layer 140 being positioned between the enemy and the inflatable member 110, as a one-handed offensive shield (e.g., the user can position his or her forearm through the handles 152 of lateral strap assembly 150) and enabling the user to use his or her other hand to, for example, return fire to an enemy. Additionally, because protective layer 140 is preferably comprised of a plurality of detached or detachable layers of ballistic resistant materials, should one or more of the layers become damaged, the damaged layers can be relatively easily replaced without having to discard the entire protective layer 140, which could be both time consuming and expensive. By way of example and not limitation, it is contemplated that protective layer 140 could be comprised of approximately twenty layers of Kevlar® material. Also, the immediately adjacent presence of inflatable member 110 helps to absorb and distribute the shock and impact forces of small arms fire and other projectiles, thereby reducing the potential for damage to protective layer 140 and end user soft tissue damage.

Figure 2:
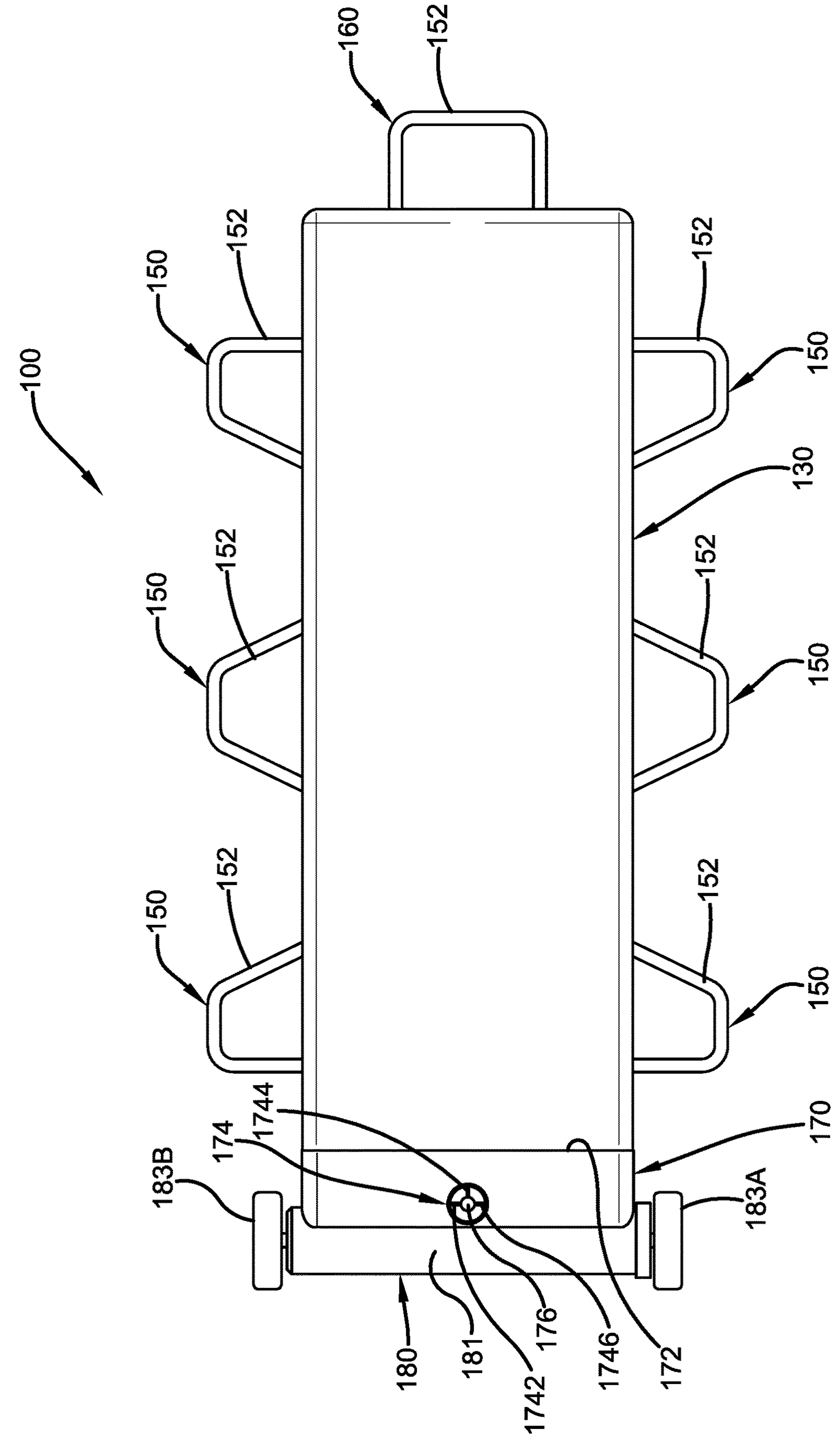
FIG. 2 illustrates a top view of the improved medical backboard device of FIG. 1.
Figure 3:
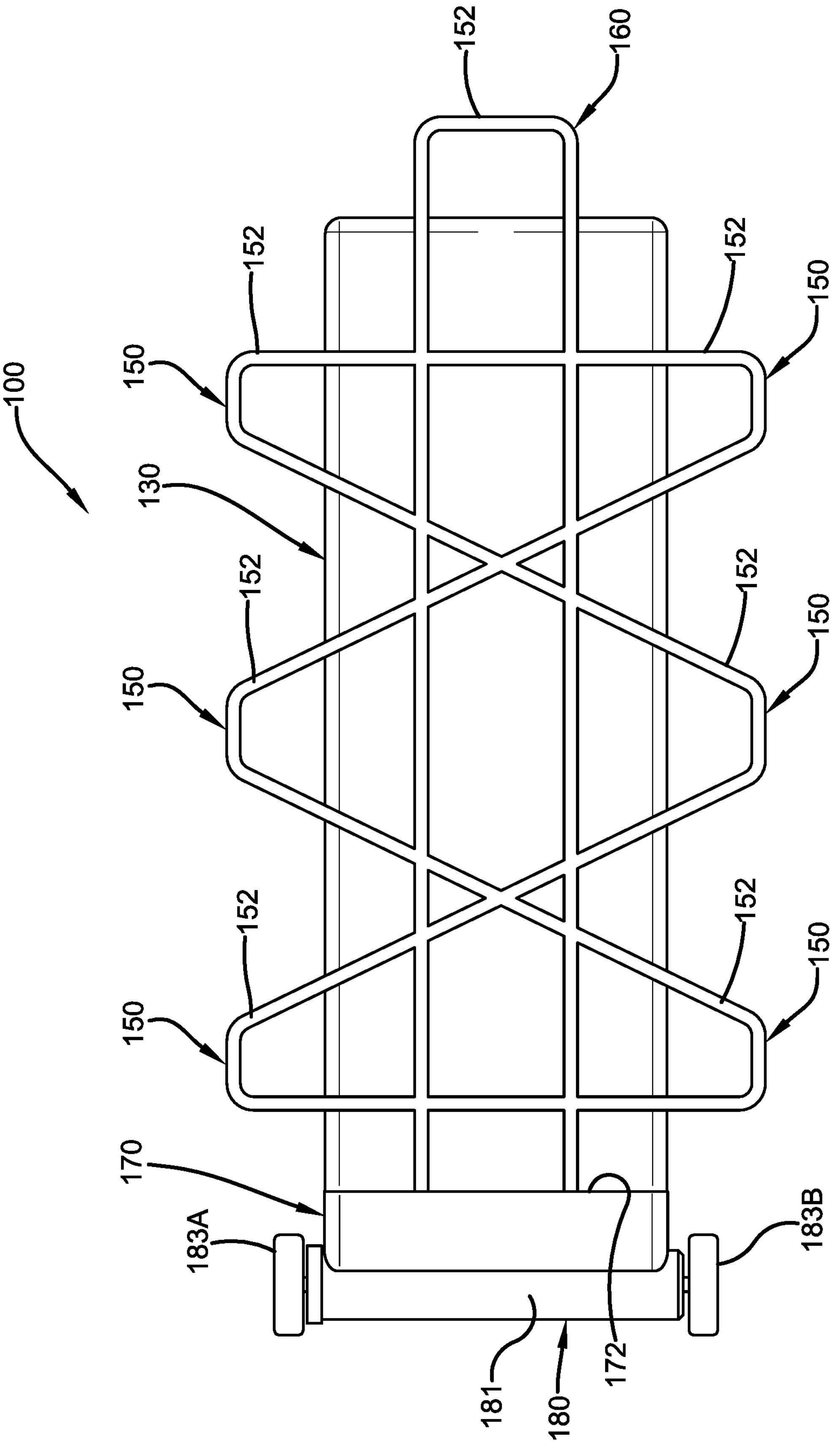
FIG. 3 illustrates a bottom view of the improved medical backboard device of FIG. 1.
Figure 4:
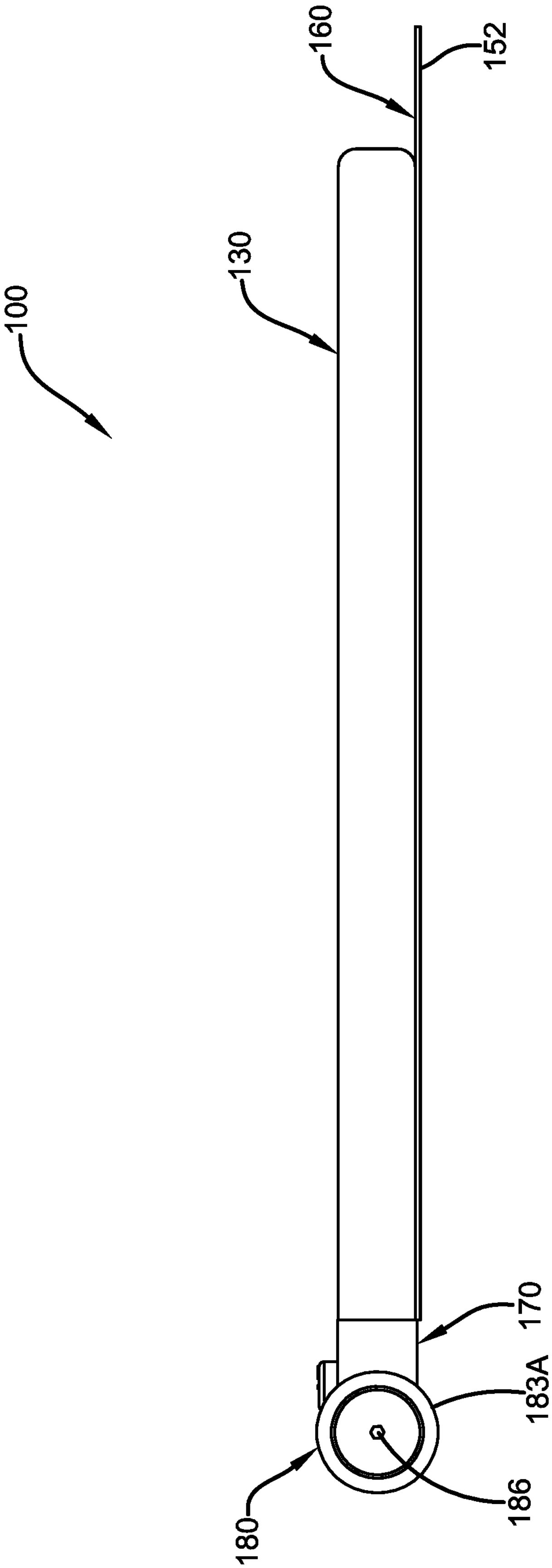
FIG. 4 illustrates a side elevational view of the improved medical backboard device of FIG. 1
Figure 5:
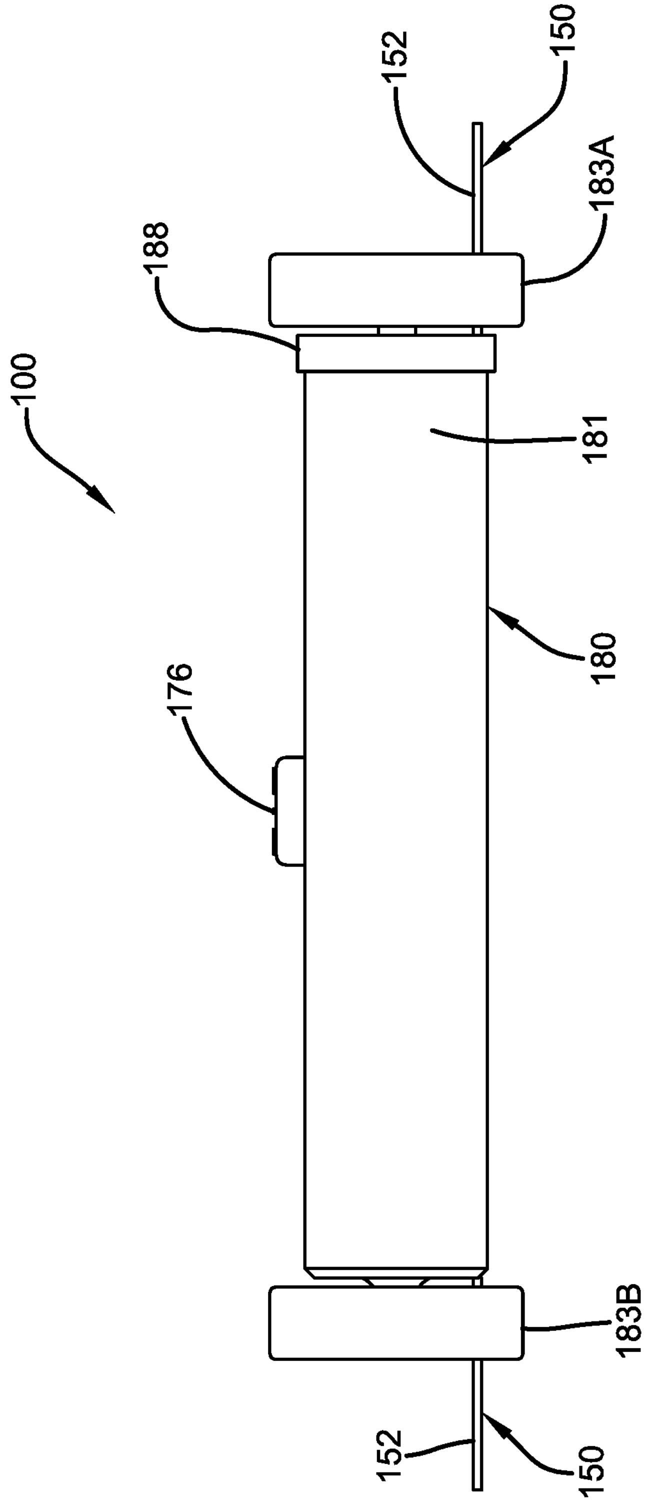
FIG. 5 illustrates a rear elevational view of the improved medical backboard device of FIG. 1
Figure 11:
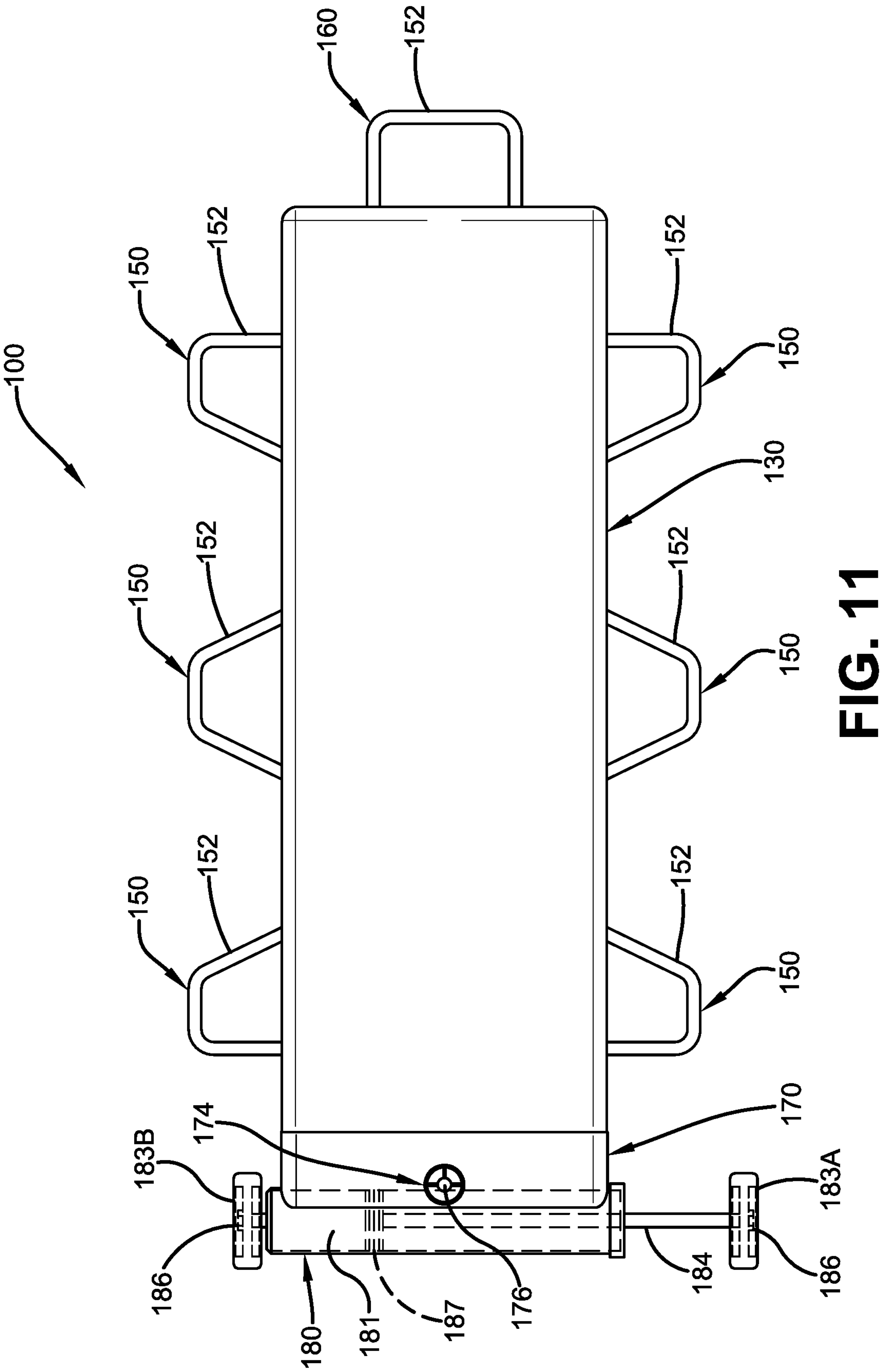
FIG. 11 illustrates a perspective view of the improved medical backboard device of FIG. 1 with hidden lines to show certain interior features and with the wheel/pump handle extended and ready to be compressed (i.e., in an upstroke position).

As best shown in FIGS. 2 and 3, lateral strap assembly 150 is preferably an elongated nylon strap that can be positioned in a cross-member configuration along, and attached to, the underside of protective cover 130 to form a plurality of handles 152. Handles 152 can be used by the user to transport an injured individual, such as a soldier, off of the battlefield. Further, as best shown in FIGS. 2 and 3, longitudinal strap assembly 160 is also preferably an elongated nylon strap that can be positioned longitudinally along, and attached to, the underside of protective cover 130 to form an additional handle 152 that can be by a user to pull device 100 longitudinally to take advantage of the presence of the wheel assembly 180, as described more fully below. Alternatively, it is also contemplated that additional (or fewer) lateral straps/handles and longitudinal straps/handles can be used with device 100, and that longitudinal strap assembly 160 can be configured to comprise two separate handles 152, one positioned on each longitudinal end of device 100. Each of lateral strap assembly 150 and longitudinal strap assembly 160 can be attached to the underside of protective cover 130 by any means commonly known in the art, such as via stitching, adhesives, plastic welding, etc. Alternatively, each of lateral strap assembly 150 and longitudinal strap assembly 160 may be housed within the interior of protective cover 130, as best shown in FIG. 11. Additionally, it is also contemplated that other strap assemblies (not shown) could be included as well to, for example, secure the patient to the medical backboard device 100 during transportation.

As best shown in FIGS. 1, 6 and 7, housing 170 is preferably a box like structure that is comprised of an opening 172 therein for receipt of at least a portion of protective cover 130, inflatable member 110, protective layer 140, a valve mode selector 174, an intake port 176 and an exit port 178. Intake port 176 is in fluid communication with exit port 178, and permits the introduction of a compressed gas, such as air, from an external source such as air supply (not shown), a compressed gas canister (not shown) or from the wheel assembly 180, which may also serve as a pump as explained more fully below, to inflate inflatable member 110 via exit port 178 which is in fluid communication with port 119. Further, valve mode selector 174 preferably has at least the following three settings, namely, inflate 1742 to permit the introduction of a compressed gas to inflate inflatable member 110, deflate 1744 to permit the deflation of inflatable member 110, and closed 1746 to permit the inflatable member 110 to remain in an inflated state. As previously stated, housing 170 is also useful for storing and transporting inflatable member 110 in a deflated state, a cylinder of compressed gas (not shown) or other items, such as medical supplies, medicine, a first aid kit, or the like.

As best shown in FIGS. 1-7 and 10-11, wheel assembly 180 is attachable to housing 170, and is preferably comprised of a cylinder 181 having an opening 182 therein, a pair of spaced apart wheels 183A and 183B, a rod or axle 184, one or more nuts or other fasteners 186, a piston 187 having roughly the same exterior diameter as the interior dimeter of cylinder 181 and that is attached to said rod 184, and a cap 188 removably attached to one end of the cylinder 181. More specifically, respective ends of rod 184 may be threaded for receipt of nuts 186, and to secure wheel 183A and piston 187, which are positioned there along. Each of rod 184 and piston 187 are preferably housed within cylinder 181 which may be sealed in an airtight manner by removable cap 188, and wheel 183A is rotatably attached to rod 184 and secured thereon by nut 186. Wheel 183B is rotatably attached to cylinder housing 181. The presence and positioning of wheels 183A, B on wheel assembly 180 at one end of device 100 permit a user to use the longitudinal strap assembly 160 at the opposite end of device 100 to pull medical backboard device 100 along a ground surface, thereby making for easier handling of the medial backboard device 100 and transporting of an injured individual, such as a soldier, positioned thereon (not shown).

Figure 10:
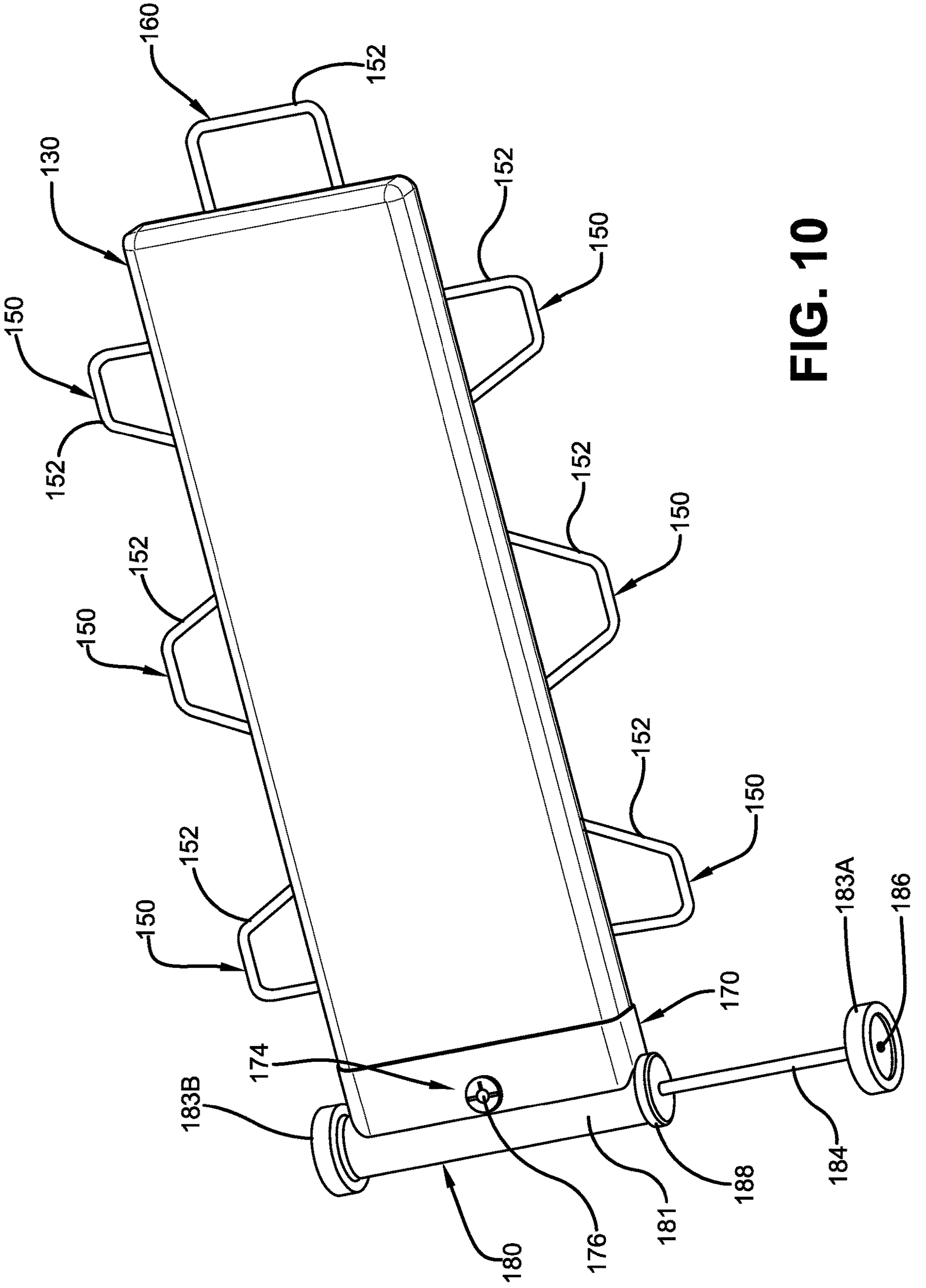
FIG. 10 illustrates a perspective view of the improved medical backboard device of FIG. 1 with the wheel/pump handle extended and ready to be compressed (i.e., in an upstroke position).

Additionally, should a source of compressed gas not be readily available to inflate inflatable member 110 when needed, a user can use the wheel assembly 180 as a pump. More specifically, and as best shown in FIGS. 10-11, a user can pull wheel 183A in a direction opposite of the opposing wheel 183B, thereby causing the piston 187 to move within cylinder 181 in the direction of the removable cap 188, and then reverse direction to create a compressive force, similar to that of an air pump, within cylinder 181 that can in turn be used to inflate inflatable member 110 via the various ports referenced above. Further, when fully inserted into cylinder 181 (i.e., in a downstroke position), piston 187 and wheel rod 184 can be locked into position to prevent the same from inadvertently and undesirably travelling in an upstroke direction when device 100 is in use.

In a further embodiment of the present invention, wheel assembly 180 may be eliminated and replaced with a pocket or sleeve (not shown) attached to protective cover 130 for housing a container of compressed gas (not shown) therein. More specifically, the container of compressed gas can be in fluid communication with port 119 of inflatable member 110 for purposes of inflating the same. Additionally, when not in use, protective cover 130 and its contents, namely deflated backboard 110 and protective layer 140 may be wrapped around the container of compressed gas to protect and transport the same.

Notwithstanding the forgoing, the improved medical backboard device 100 of the present invention and its various components can be of any suitable size and configuration as is known in the art without affecting the overall concept of the invention, provided that it accomplishes the above stated objectives. One of ordinary skill in the art will appreciate that the size, configuration and material of the improved medical backboard device 100 and its various components as shown in the FIGS. are for illustrative purposes only, and that many other sizes of the improved medical backboard device 100 are well within the scope of the present disclosure. Although the dimensions of the improved medical backboard device 100 and its various components are important design parameters for user convenience, the improved medical backboard device 100 and it components may be of any size that ensures optimal performance during use and/or that suits user need and/or preference.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A medical backboard device comprising:

an inflatable member;

a protective layer comprising a plurality of ballistic resistant layers that are detachable from one another;

a protective cover;

at least one strap assembly; and a housing comprised of a valve; and a wheel assembly comprising a cylinder comprising an opening, an axle, and a piston attached to the axle, and a pair of wheels rotatably attached to opposing ends of the axle; and wherein the piston and a portion of the axle are sealed within the cylinder in an airtight manner via a cap attached to one end of the cylinder; and wherein the inflatable member comprises a top, a bottom and a plurality of filaments positioned within and configured to span an interior of the inflatable member between the top and the bottom; and wherein the plurality of filaments are placed in tension keeping the medical backboard device planar when the inflatable member is inflated to at least ten pounds per square inch of pressure; and wherein one of the pair of wheels causes the piston to move within the cylinder creating a compressive force when pulled to inflate the inflatable member.

2. The medical backboard device of claim 1, wherein the inflatable member and the protective layer are housed within the protective cover.

3. The medical backboard device of claim 1, wherein the valve is in fluid communication with the inflatable member.

4. The medical backboard device of claim 1 further comprising an inflating means, wherein the inflating means is comprised of at least one of a container of compressed gas or a pump assembly.

5. The medical backboard device of claim 1, wherein the inflatable member can be stored within the housing or wrapped around the housing when not in use.

6. The medical backboard device of claim 1, wherein the valve is comprised of an inlet and an outlet.

7. The medical backboard device of claim 1, wherein the housing comprises an opening and at least a portion of the inflatable member is positioned within said opening.

* * * * *